US007658184B2

(12) United States Patent
Matas et al.

(10) Patent No.: US 7,658,184 B2
(45) Date of Patent: Feb. 9, 2010

(54) METHOD AND APPARATUS FOR PROVIDING FUEL TO AN AIRCRAFT ENGINE

(75) Inventors: Scott Matas, Mooresville, NC (US); Charles Schneider, Watsontown, PA (US); Allan Watson, Northville, MI (US)

(73) Assignee: Lycoming Engines, a division of Avco Corportion, Williamsport, PA (US)

( * ) Notice: Subject to any disclaimer, the term of this patent is extended or adjusted under 35 U.S.C. 154(b) by 91 days.

(21) Appl. No.: 12/121,242

(22) Filed: May 15, 2008

(65) Prior Publication Data

US 2009/0283080 A1 Nov. 19, 2009

(51) Int. Cl.
*F02B 23/00* (2006.01)
*B60T 7/12* (2006.01)

(52) U.S. Cl. ........................ 123/676; 123/672; 701/103

(58) Field of Classification Search ................ 123/434, 123/672, 674, 676; 701/103, 104, 105
See application file for complete search history.

(56) References Cited

U.S. PATENT DOCUMENTS

| | | | | |
|---|---|---|---|---|
| 4,156,413 | A | 5/1979 | Taplin | |
| 4,344,317 | A * | 8/1982 | Hattori et al. | 73/23.32 |
| 4,452,207 | A | 6/1984 | Moore, Jr. | |
| 4,572,135 | A | 2/1986 | Nakajima et al. | |
| 5,253,630 | A | 10/1993 | Akazaki et al. | |
| 5,381,774 | A * | 1/1995 | Nakajima | 123/674 |
| 5,511,526 | A * | 4/1996 | Hamburg et al. | 123/406.55 |
| 5,671,720 | A | 9/1997 | Uchikawa | |
| 5,941,222 | A | 8/1999 | Braly | |
| 6,182,647 | B1 * | 2/2001 | Hori et al. | 123/674 |
| 6,317,680 | B1 | 11/2001 | Luttrell et al. | |
| 7,039,518 | B2 * | 5/2006 | Ingram et al. | 701/103 |
| 7,069,719 | B2 | 7/2006 | Takubo et al. | |
| 7,287,492 | B2 | 10/2007 | Leone et al. | |
| 7,314,028 | B2 | 1/2008 | Yasui et al. | |
| 7,533,662 | B2 * | 5/2009 | Kiyomura et al. | 123/672 |
| 2005/0137778 | A1 | 6/2005 | Ingram | |

FOREIGN PATENT DOCUMENTS

GB 2062290 A 5/1981

OTHER PUBLICATIONS

"Fuel Mixture Leaning Procedures," Textron Lycoming Service Instruction No. 1094D, Mar. 25, 1994, pp. 1-6.

"Experts Are Everywhere to Help You—The 'New' Old Leaning Technique," Lycoming, A Textron Company, 2000, pp. 1-6.

* cited by examiner

*Primary Examiner*—John T Kwon
(74) *Attorney, Agent, or Firm*—BainwoodHuang

(57) ABSTRACT

An aircraft engine includes an aircraft engine controller configured to detect an actual peak exhaust gas temperature of a cylinder assembly. The aircraft engine controller detects an intersection between a first function representing a relationship between a set of rich exhaust gas temperature signals and a corresponding set of rich fuel-air ratio values and a second function representing a relationship between a set of lean exhaust gas temperature signals and a set of lean fuel-air ratio values. Based upon the intersection between the first and second functions, the engine controller detects an actual peak fuel-air ratio value for the cylinder assembly and can determine if a correction in the fuel-air ratio of a fuel-air mixture provided to the cylinder assembly is required. Accordingly, the engine controller provides each cylinder assembly of the aircraft engine with an accurate fuel-air mixture to allow for operation of the engine with optimal fuel economy.

20 Claims, 4 Drawing Sheets

METHOD AND APPARATUS FOR PROVIDING FUEL TO AN AIRCRAFT ENGINE

BACKGROUND

Conventional aircraft engines, such as piston aircraft engines, typically require adjustment to the ratio of air to fuel, termed the air-fuel mixture, provided to the engines during operation. For example, during takeoff, a piston aircraft engine typically utilizes a rich air-fuel mixture where the air-fuel mixture is stoichiometric. For better fuel economy after takeoff when the aircraft reaches lower-power cruising conditions, the aircraft engine can utilize a leaner air-fuel mixture where the amount of air added to the air-fuel mixture is increased such that the air-fuel mixture is greater than stoichiometric.

In conventional piston aircraft engines, once the aircraft reaches a cruising speed, a pilot manually controls leaning of the air-fuel mixture in an attempt to optimize fuel economy. During operation the pilot visually monitors an exhaust gas temperature (EGT) gauge, maintains the aircraft's throttle in a fixed state, and adjusts a fuel control lever to control the amount of fuel delivered to the engine. Based upon an output from the EGT gauge, the pilot adjusts the fuel control lever to set the air-fuel mixture to a certain amount to allow the engine to operate at an efficient fuel economy. For example, as the pilot reduces the amount of fuel delivered to the engine, the pilot can observe an increase in the EGT as provided by the EGT gauge up to a certain range of EGT values. As the pilot further decreases the amount of fuel delivered to the engine, the pilot will typically observe a decrease in the EGT provided by the EGT gauge. Such a decrease in the EGT value indicates to the pilot that he has reduced the amount of fuel delivered to the engine past an amount that allows the engine to operate at an efficient fuel economy. Therefore, in order to maximize the efficiency of the aircraft engine, the pilot increases the amount of fuel delivered to the engine until the EGT gauge indicates an increase in the EGT up to the previously detected range of EGT values.

SUMMARY

Conventional methods for adjusting the air-fuel mixture provided to an aircraft engine suffer from a variety of deficiencies. As described above for aircraft having conventional piston aircraft engines, the aircraft pilot visually observes changes in the engine's EGT and manually adjusts the air-fuel mixture accordingly. However, because the procedure is operator driven, the operator may not be able to provide the aircraft engine with an optimal air-fuel ratio, corresponding with a peak EGT, in order to provide optimal fuel economy to the engine. For example, as the pilot reduces the amount of fuel delivered to the engine, the pilot can observe an increase in the EGT as provided by the EGT gauge up to a certain range of EGT values. Because the pilot's attention must be divided among several tasks, the detection of peak EGT can be inaccurate. For certain engines, it is not even possible to achieve peak EGT because running those engines at or near peak EGT can cause either detonation in the engine's cylinder assemblies or excessive turbocharger turbine inlet temperatures, the occurrence of which can damage or destroy engine components. Additionally, during operation of the conventional piston aircraft engines, the aircraft pilot must adjust the air-fuel mixture for all cylinders simultaneously. Accordingly, because the pilot cannot adjust the air-fuel mixture provided to the engine on a cylinder-by-cylinder basis, the pilot cannot accurately optimize the fuel efficiency of the engine.

Embodiments of the present invention overcome these deficiencies and provide an apparatus and method for providing fuel to an aircraft engine to account for an increase in or a reduction of a fuel injector's flow rate over time. In one arrangement, an aircraft engine includes an aircraft engine controller configured to detect an actual peak exhaust gas temperature of a cylinder assembly independently of the other cylinder assemblies. For each cylinder assembly, the aircraft engine controller detects an intersection between a first function representing a relationship between a set of rich exhaust gas temperature signals and a corresponding set of rich fuel-air ratio values and a second function representing a relationship between a set of lean exhaust gas temperature signals and a set of lean fuel-air ratio values. Based upon the intersection between the first and second functions, the engine controller detects the actual peak EGT and the corresponding fuel-air ratio value for the cylinder assembly and, accordingly, can determine if a correction in the fuel-air ratio provided to the cylinder assembly is required. With such a configuration, the engine controller provides each cylinder assembly of the aircraft engine with an accurate fuel-air mixture to allow for operation of the engine with optimal fuel economy. Because the engine controller determines the actual peak exhaust gas temperature for the cylinder assembly, the engine controller can skip over the fuel-air mixtures which tend to result in the occurrence of detonation events or excessive turbine inlet temperatures.

In one arrangement, a method for adjusting a fuel-air ratio of the mixture provided to an engine cylinder of an engine includes detecting a set of rich exhaust gas temperature signals corresponding to a set of rich fuel-air ratio values, each of the set of rich fuel-air ratio values having a fuel-air ratio value that is greater than a threshold or theoretical peak EGT fuel-air ratio value. The method includes detecting a set of lean exhaust gas temperature signals corresponding to a set of lean fuel-air ratio values, each of the set of lean fuel-air ratio values having a fuel-air ratio value that is less than the theoretical peak EGT fuel-air ratio value. The method includes detecting an intersection between the set of lean exhaust gas temperature signals and the set of rich exhaust gas temperature signals, the intersection associated with the actual peak EGT fuel-air ratio value. The method includes comparing the actual peak EGT fuel-air ratio value with the theoretical peak EGT fuel-air ratio value and adjusting the fuel-air ratio of the mixture provided to the cylinder assembly so that the theoretical EGT fuel-air ratio value and actual peak EGT fuel-air ratio value are substantially the same.

In one arrangement, an aircraft engine control system includes an exhaust gas temperature sensor, the exhaust gas temperature sensor configured to generate gas temperature signals associated with an aircraft engine cylinder of an aircraft engine and an engine controller disposed in electrical communication with the exhaust gas temperature sensor, the engine controller being operable to adjust a fuel-air ratio for a fuel-air mixture provided to the aircraft engine cylinder of an aircraft engine. The engine controller is configured to detect a set of rich exhaust gas temperature signals corresponding to a set of rich fuel-air ratio values, each of the set of rich fuel-air ratio values having a fuel-air ratio value that is greater than a theoretical peak EGT fuel-air ratio value. The engine controller is configured to detect a set of lean exhaust gas temperature signals corresponding to a set of lean fuel-air ratio values, each of the set of lean fuel-air ratio values having a fuel-air ratio value that is less than the theoretical peak EGT fuel-air ratio value. The engine controller is configured to detect an intersection between the set of lean exhaust gas temperature signals and the set of rich exhaust gas temperature signals, the intersection associated with an actual peak EGT fuel-air ratio value. The engine controller is configured to compare the actual peak EGT fuel-air ratio value with the theoretical peak EGT fuel-air ratio value and adjust the fuel-air ratio of the mixture provided to the cylinder assembly so that the theoretical EGT fuel-air ratio value and actual peak EGT fuel-air ratio value are substantially the same.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention provide an apparatus and method for providing fuel to an aircraft engine to account for an increase in or a reduction of a fuel injector's flow rate over time. In one arrangement, an aircraft engine includes an aircraft engine controller configured to detect an actual peak exhaust gas temperature of a cylinder assembly independently of the other cylinder assemblies. For each cylinder assembly, the aircraft engine controller detects an intersection between a first function representing a relationship between a set of rich exhaust gas temperature signals and a corresponding set of rich fuel-air ratio values and a second function representing a relationship between a set of lean exhaust gas temperature signals and a set of lean fuel-air ratio values. Based upon the intersection between the first and second functions, the engine controller detects the actual peak EGT and the corresponding fuel-air ratio value for the cylinder assembly and, accordingly, can determine if a correction in the fuel-air ratio provided to the cylinder assembly is required. With such a configuration, the engine controller provides each cylinder assembly of the aircraft engine with an accurate fuel-air mixture to allow for operation of the engine with optimal fuel economy. Because the engine controller determines the actual peak exhaust gas temperature for the cylinder assembly, the engine controller can skip over the fuel-air mixtures which tend to result in the occurrence of detonation events or excessive turbine inlet temperatures.

Figure 1:
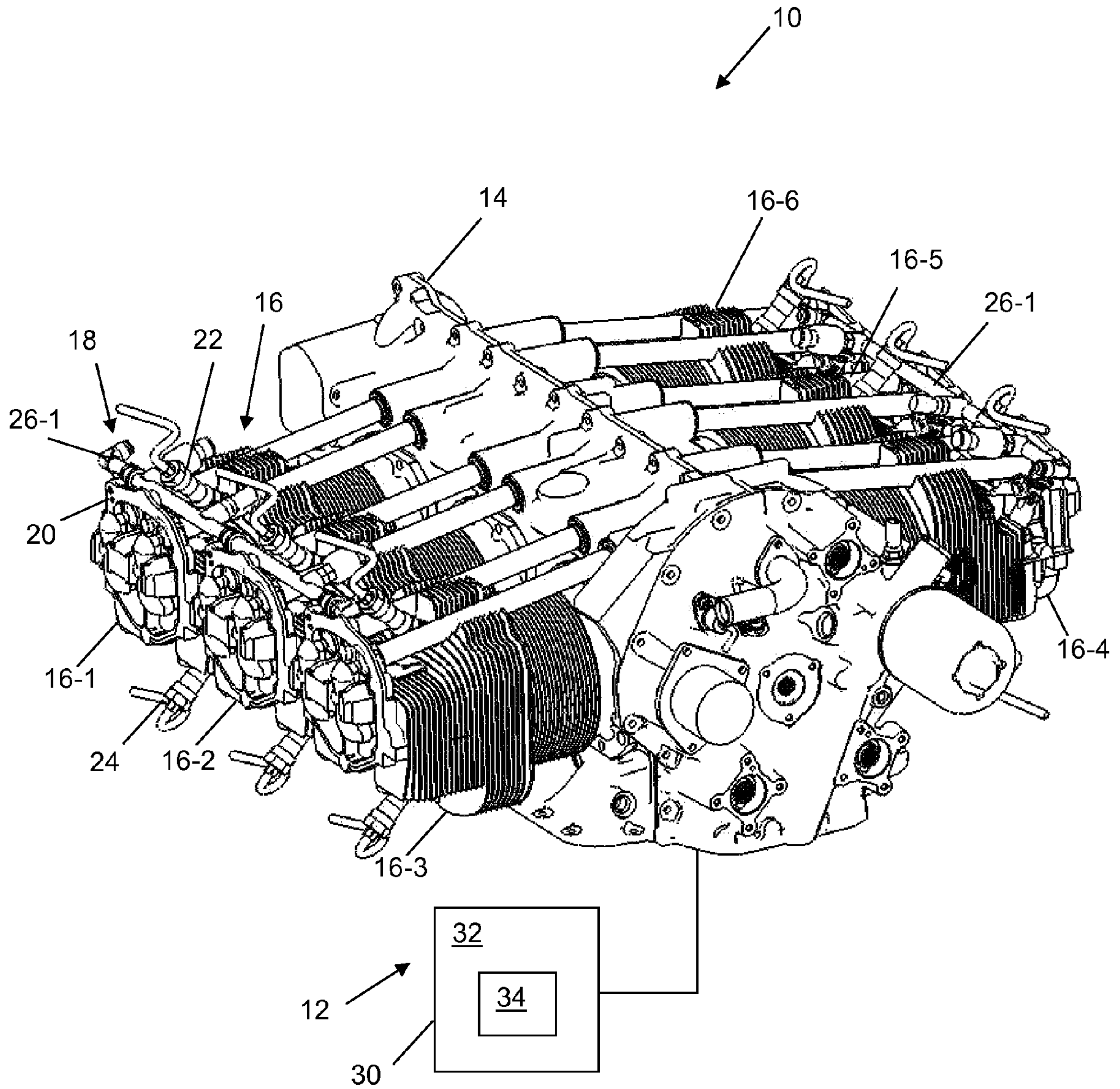
FIG. 1 illustrates a rear perspective view of an aircraft engine having an engine controller configured according to one embodiment of the invention.

FIG. 1 illustrates an engine 10 and an engine control system 12 according to one embodiment of the invention. The engine 10, such as a four-stroke aircraft engine, includes a crankcase housing 14 that contains a crankshaft (not shown) and that carries cylinder assemblies 16 and a fuel delivery system 18. Each cylinder assembly 16 includes a connecting rod (not shown) that connects the crankshaft to a piston (not shown) disposed within the cylinder housings 20 of each cylinder assembly 16. Each cylinder assembly 16 also carries primary and secondary spark plugs 22, 24. The spark plugs 22, 24 are configured to ignite a fuel and air mixture contained within the cylinder assembly 16 during operation. The secondary spark plug 24 operates as a back-up to the primary spark plug 22 such that, in the event of failure of a primary spark plug 22 for a cylinder assembly 16, the secondary spark plug 24 provides ignition of the fuel and air mixture within the cylinder assembly 16.

Figure 2:
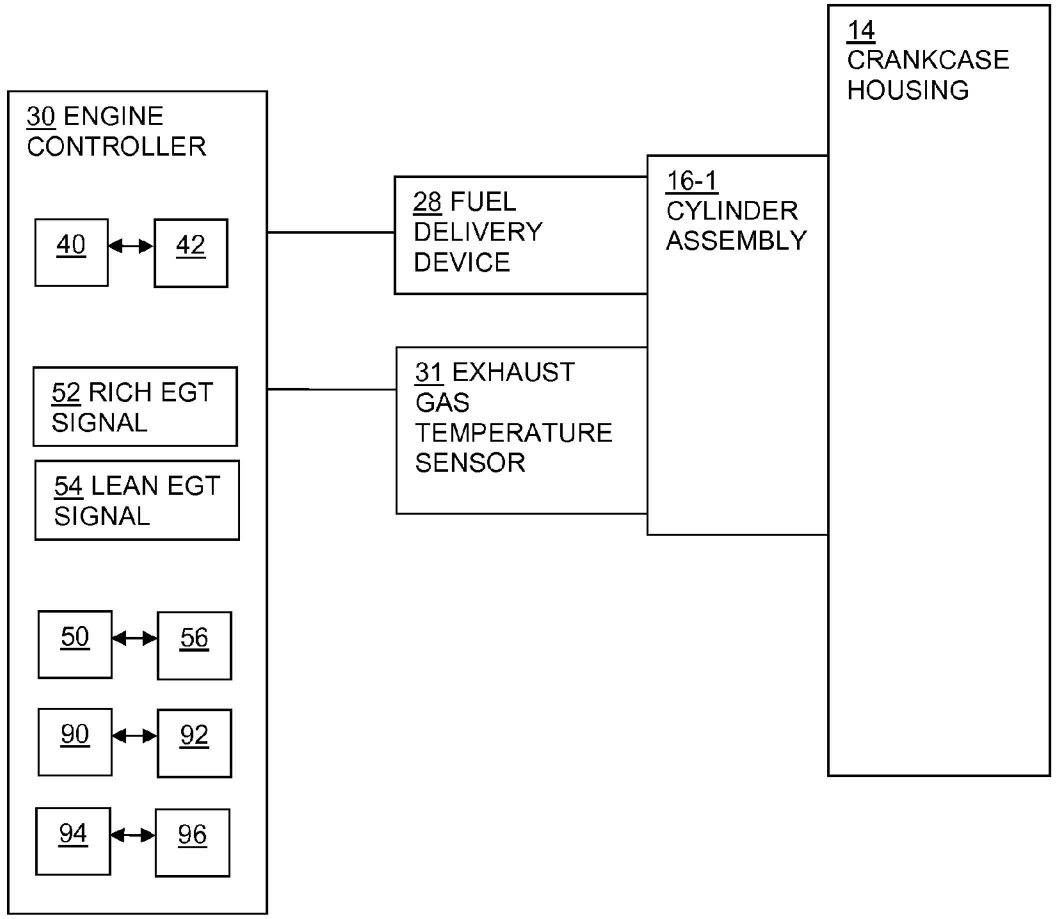
FIG. 2 illustrates a schematic representation of the engine controller and cylinder assembly of FIG. 1.

The fuel delivery system 18 is configured to provide fuel from a fuel source to each of the cylinder assemblies 16. The fuel delivery system 18 includes a fuel pump, fuel rails 26-1, 26-2, and fuel delivery devices 28, as shown in FIG. 2, such as fuel injectors configured to provide fuel from a fuel source to each of the cylinder assemblies 16. In use, each cylinder assembly 16 receives fuel via the fuel delivery system 18. The primary spark plug 22 ignites a fuel air mixture contained within each cylinder housing 20 thereby causing the piston and connecting rod disposed within each cylinder housing 20 to reciprocate therein. The reciprocating motion of the piston and connecting rod rotates the crankshaft which, in turn, rotates other components associated with the aircraft engine 10.

The engine control system, such as an aircraft engine control system 12, is configured to control the performance of the aircraft engine 10 during operation. The aircraft engine control system 12 includes an engine controller 30 and a set of sensors (not shown) disposed in electrical communication with the engine controller 30. The set of sensors measure various engine and environmental conditions, engine fluid pressures, exhaust gas temperature, air temperature, and air density and provide signals corresponding to the measured conditions to the engine controller 30. In one arrangement, the set of sensors includes an exhaust gas temperature (EGT) sensor 31, as shown in FIG. 2, configured to generate signals representative gas temperature of the exhaust gas produced by the corresponding cylinder assembly 16. While the engine controller 30 can be configured in a variety of ways, in one arrangement the engine controller 30 is configured as a Full Authority Digital Engine Controller (FADEC). The FADEC 32 includes an electronic engine control unit (ECU) 34, such as a processor and a memory, which receives various data signals from the set of sensors and calculates engine operating parameters based upon the data signals. Based upon the engine operating parameters, the FADEC 32 adjusts operating parameters associated with the aircraft engine 10 to optimize its performance.

In one arrangement, the engine controller 30 is configured to optimize the fuel efficiency of the aircraft engine 10 as it operates. For example, as will be described below, the engine controller 30 is configured to detect an actual peak exhaust gas temperature for each cylinder assembly 16 of the aircraft engine 10. Based upon such detection, the engine controller 30 detects if a correction in the fuel-air ratio for a fuel-air mixture provided to each cylinder assembly 16 is required.

With reference to FIG. 2, prior to performing the optimization procedure, the engine controller 30 receives an enable condition 40 associated with the aircraft engine 10 and, based upon a comparison with an enable condition threshold 42, either suppresses or initiates the optimization procedure. In one arrangement, the enable condition 40 is configured as the aircraft engine 10 speed in revolutions per minute (RPM). For example, assume the enable condition threshold 42 is configured as a range between 2,200 RPM and 2,400 RPM. Assume the case where the engine controller 30 receives an enable condition 40 having a value of 2,600 RPM (e.g., indicative of the aircraft engine's 10 speed at takeoff). Because the enable condition 40 falls outside of the enable condition threshold range, the engine controller 30 does not initiate the fuel efficiency optimization procedure. However, assume the case where the engine controller 30 receives an enable condition 40 having a value of 2,400 RPM. Because the enable condition 40 falls within of the enable condition threshold range, the engine controller 30 will initiate the fuel efficiency optimization procedure.

Figure 3:
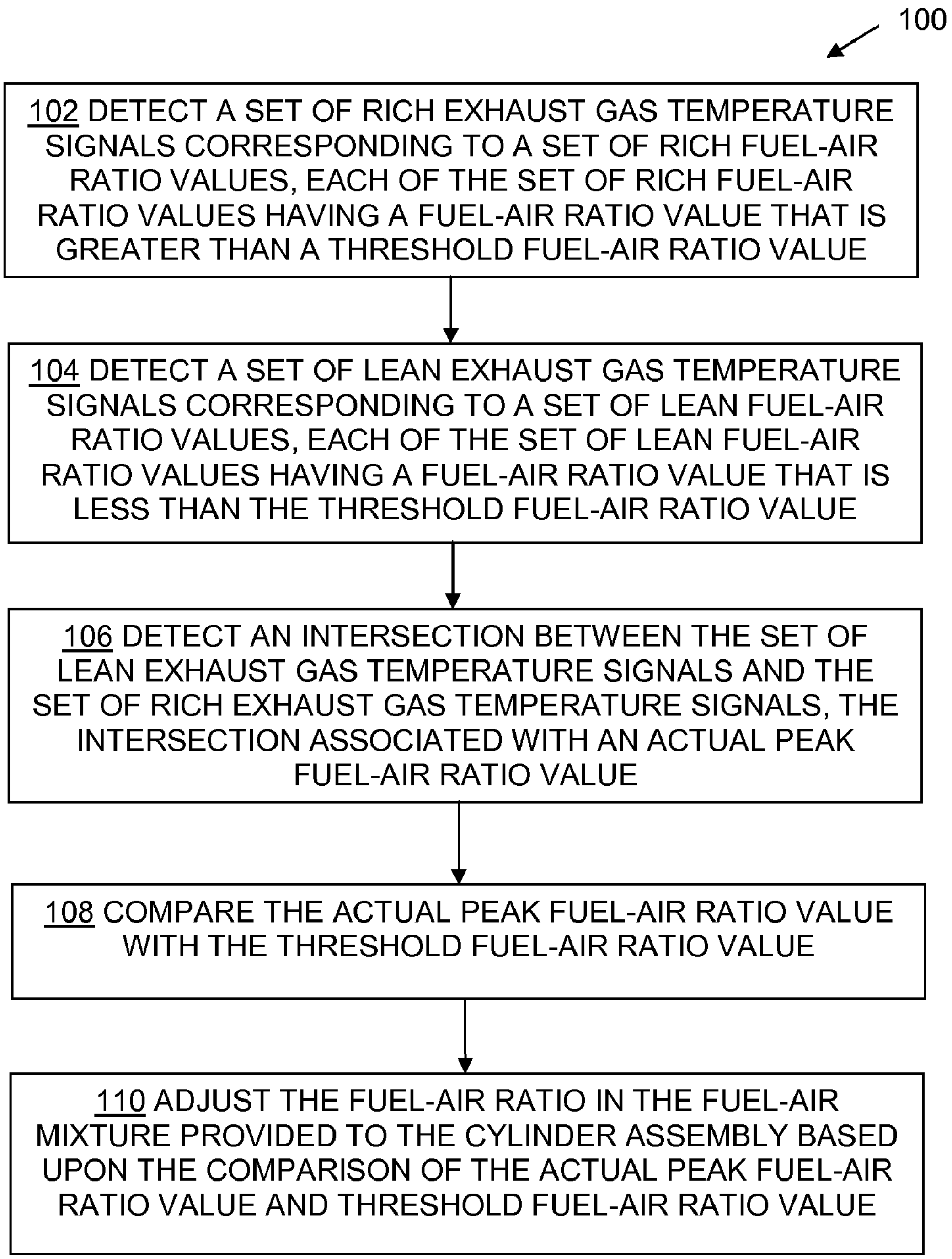
FIG. 3 is a flowchart illustrating steps performed by the engine controller of FIG. 1 when adjusting a fuel-air ratio for a fuel-air mixture provided to the cylinder assembly of the aircraft engine.

FIG. 3 illustrates a flowchart 100 of a procedure performed by the engine controller 30 when adjusting a fuel-air ratio for a fuel-air mixture provided to a cylinder assembly 16 of an aircraft engine 10. The engine controller 30 performs the procedure on each cylinder assembly 16 of the aircraft engine 10. However, for convenience, the following procedure relates to a first cylinder assembly 16-1, as illustrated in FIG. 2.

With reference to FIG. 3, in step 102, the engine controller 30 detects a set of rich exhaust gas temperature signals 52 corresponding to a set of rich fuel-air ratio values, each of the set of rich fuel-air ratio values having a fuel-air ratio value that is greater than a threshold fuel-air ratio value 50. For example, with reference to FIG. 2, when the engine controller 30 initiates the fuel efficiency optimization procedure, the engine controller 30 sets a throttle associated with the aircraft engine 10 such that the amount of air included in the fuel-air mixture provided to the cylinder assembly 16-1 remains approximately constant. The engine controller 30 then adjusts the amount of fuel included in the fuel-air mixture such that the fuel-air ratio of the mixture is greater than the threshold or theoretical peak fuel-air ratio value 50. In one arrangement, assume the engine controller 30 is configured such that the threshold fuel-air ratio value 50 is 1:14.7 or 0.068. Accordingly, the engine controller 30 initially adjusts the amount of fuel included in the fuel-air mixture such that the fuel-air ratio is greater than 0.068 and such that the fuel-air mixture provided to the cylinder assembly 16-1 is a rich mixture. For example, with reference to the graph 150 of FIG. 4, the engine controller 30 adjusts the amount of fuel included in the fuel-air mixture such that the rich fuel-air ratio has a value of about 0.077, as indicated by data element 60.

Figure 4:
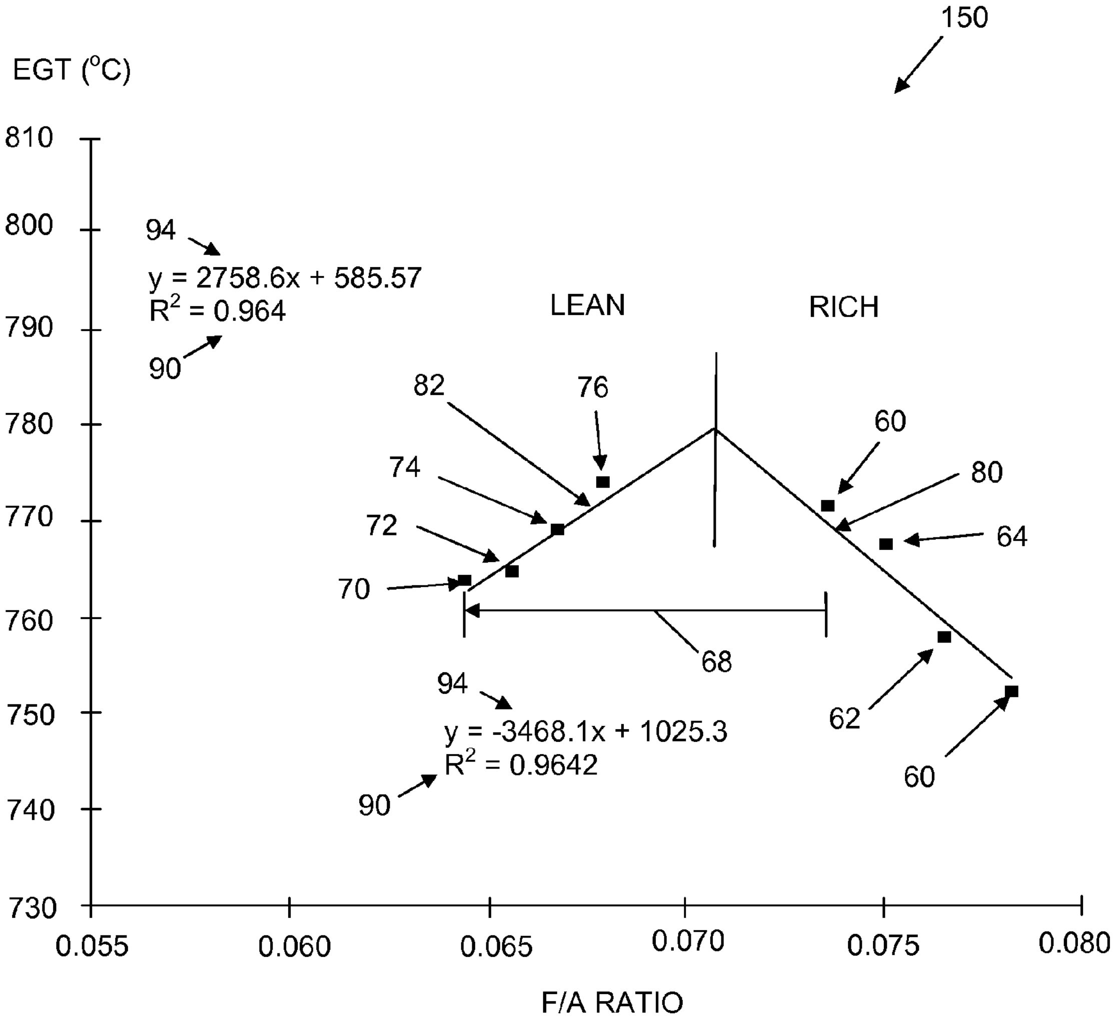
FIG. 4 is a graph illustrating relationships between exhaust gas temperature and a fuel-air ratio for a cylinder assembly of FIG. 1.

Once the fuel-air mixture provided to the cylinder assembly 16-1 is sufficiently enriched, the engine controller 30 detects the set of rich exhaust gas temperature signals 52 corresponding to the set of rich fuel-air ratio values. For example, with reference to FIG. 4, in the case where the rich fuel-air ratio has a first value of about 0.077, the engine controller 30 receives, from the EGT sensor 31, an EGT sensor signal 52 indicative of the exhaust gas having a temperature of about 753° C. The engine controller 30 then reduces the amount of fuel included in the fuel-air mixture to reduce the rich fuel-air ratio value to a second value and receives the corresponding EGT sensor signal 52 from the EGT sensor 31. For example, the engine controller 30 reduces the amount of fuel included in the fuel-air mixture such that the rich fuel-air ratio has a value of about 0.077, indicated by data element 62 and receives, from the EGT sensor 31, an EGT sensor signal 52 indicative of the exhaust gas having a temperature of about 759° C. The engine controller 30 performs the process of reducing the rich fuel-air ratio value and receiving a corresponding EGT sensor signal 52 for a preset number of iterations. For example, as shown in FIG. 4, the engine controller 30 performs the process a total of three times, as indicated by data elements 62, 64, and 66. Also during this procedure, as the engine controller 30 reduces the amount of fuel included in the fuel-air mixture to reduce the rich fuel-air ratio value, the engine controller 30 maintains the fuel-air mixture on the rich side. For example, as the engine controller 30 reduces the amount of fuel in the fuel-air mixture provided to the cylinder assembly 16-1, the engine controller 30 maintains the rich fuel-air ratio value to be greater than the threshold fuel-air ratio value 50 of 0.068.

Returning to FIG. 2, in step 104, the engine controller 30 detects a set of lean exhaust gas temperature signals 54 corresponding to a set of lean fuel-air ratio values, each of the set of lean fuel-air ratio values having a fuel-air ratio value that is less than the threshold fuel-air ratio value 50. In one arrangement, after detecting the set of rich exhaust gas temperature signals and prior to detecting the set of lean exhaust gas temperatures, the engine controller 30 decreases the amount of fuel in the fuel-air mixture provided to the cylinder assembly 16-1 by a relatively large amount. Such reduction ensure that, at this step, the cylinder assembly 16-1 receives a lean fuel-air mixture for operation (i.e., that the fuel-air ratio value is less than the threshold or theoretical fuel-air ratio value 50). For example, as indicated in FIG. 4, at the conclusion of step 102 described above, the cylinder assembly 16-1 receives a fuel-air mixture having a fuel-air ratio of about 0.0735. To provide the cylinder assembly 16-1 with a relatively lean fuel-air mixture, the engine controller 30 reduces 68 the amount of fuel in the fuel-air mixture to a fuel-air ratio of about 0.064, below the threshold fuel-air ratio value 50 of 0.068, as indicated by data element 70.

Once the fuel-air mixture provided to the cylinder assembly 16-1 is sufficiently leaned, the engine controller 30 detects the set of lean exhaust gas temperature signals 54 corresponding to the set of lean fuel-air ratio values. For example, with reference to FIG. 4, in the case where the rich fuel-air ratio has a first value of about 0.064, the engine controller 30 receives, from the EGT sensor 31, an EGT sensor signal 54 indicative of the exhaust gas having a temperature of about 764° C. The engine controller 30 then increases the amount of fuel included in the lean fuel-air mixture to increase the lean fuel-air ratio value to a second value. The engine controller 30 then receives a corresponding EGT sensor signal from the EGT sensor 31. For example, the engine controller 30 increases the amount of fuel included in the lean fuel-air mixture such that the lean fuel-air ratio has a value of about 0.066, indicated by data element 722 and receives, from the EGT sensor 31, an EGT sensor signal 54 indicative of the exhaust gas having a temperature of about 765° C. The engine controller 30 performs the process of increasing the lean fuel-air ratio value and receiving a corresponding EGT sensor signal 54 for a preset number of iterations. For example, as shown in FIG. 4, the engine controller 30 performs the process a total of three times, as indicated by data elements 72, 74, and 76. Also during this procedure, as the engine controller 30 increases the amount of fuel included in the fuel-air mixture to increase the lean fuel-air ratio value, the engine controller 30 maintains the fuel-air mixture on the lean side. For example, as the engine controller 30 increases the amount of fuel in the fuel-air mixture provided to the cylinder assembly 16-1, the engine controller 30 maintains the lean fuel-air ratio value to be less than the threshold fuel-air ratio value 50 of 0.068.

Returning to FIG. 2, in step 106, the engine controller 30 detects an intersection between the set of lean exhaust gas temperature signals 54 and the set of rich exhaust gas temperature signals 52, the intersection associated with an actual peak fuel-air ratio value 56. While the engine controller 30 can detect the intersection in a variety of ways, in one arrangement the engine controller 30 is configured to generate a first function 80, such as a linear regression relationship, for the set of rich exhaust gas temperature signals and the set of rich fuel-air ratio values, generate a second function, such as a linear regression relationship, representing a relationship between the set of lean exhaust gas temperature signals and the set of lean fuel-air ratio values, and detect an exhaust gas temperature value and an fuel-air ratio value common to both the first function and the second function. For example, with reference to FIG. 4, based upon the relationship 80 between the set of rich exhaust gas temperature signals and the set of rich fuel-air ratio values indicated by data elements 60, 62, 64, and 66, the engine controller 30 detects a linear relationship among the data elements 60, 62, 64, and 66 represented by the equation: y=−3468.1x+1025.3 where the variable y relates to the exhaust gas temperature and the variable x relates to the fuel-air ratio value. Additionally, based upon the relationship between the set of lean exhaust gas temperature signals and the set of lean fuel-air ratio values indicated by data elements 70, 72, 74, and 76, the engine controller 30 detects a linear relationship among the data elements 70, 72, 74, and 76 represented by the equation: y=2758.6x+585.57. By setting the equations equal to each other, the engine controller 30 can detect the intersection between the two equations associated with an actual peak fuel-air ratio value 56. In the present example, the actual peak fuel-air ratio has a value of 0.071.

Returning to FIG. 2, in step 108, the engine controller 30 compares the actual peak fuel-air ratio 56 with the threshold (i.e., theoretical peak) fuel-air ratio 50. Further, in step 110, the engine controller 30 adjusts the fuel-air ratio in the fuel-air mixture provided to the cylinder assembly 16-1 based upon the comparison of the actual peak fuel-air ratio 52 and threshold fuel-air ratio 50 (i.e., the theoretical peak EGT fuel-air ratio 50). For example, assume that under normal operating conditions, the engine controller 30 is configured to provide a fuel-air mixture to the cylinder assembly 16-1 where the fuel air mixture has a fuel-air ratio of 0.068 (i.e., the theoretical fuel-air ratio 50). In the case where the engine controller 30 compares the actual peak fuel-air ratio value of 0.071 with the theoretical fuel-air ratio value of 0.068, the engine controller 30 detects that the fuel-air ratio value 56 is greater than the theoretical fuel-air ratio value 50. Accordingly, to optimize the fuel efficiency of the cylinder assembly 16-1, the engine controller 30 increases the amount of fuel in the fuel air mixture provided to the cylinder assembly 16-1 such that the fuel-air ratio has a value of about 0.071. Once the process outlined in steps 102 through 108 has been completed for the cylinder assembly 16-1, the engine controller 30 performs the procedure on the remaining cylinder assemblies (16-2 through 16-6) associated with the aircraft engine 10.

As indicated above, the engine controller 30 is configured to detect an actual peak fuel-air ratio value 56 for the cylinder assembly 16-1 and determine if a correction in the fuel-air ratio of the fuel-air mixture provided to the cylinder assembly 16-1 is required. With such a configuration, the engine controller 30 can provide each cylinder assembly 16 of the aircraft engine 10 with an accurate fuel-air mixture to optimize fuel economy for each cylinder assembly 16. Additionally, because the engine controller determines the actual peak exhaust gas temperature for each cylinder assembly 16, the engine controller 30 limits the provision of a too lean fuel-air mixture to each cylinder assembly 16 thereby minimizing the occurrence of detonation events.

In certain cases, during operation the EGT sensor 31 for a cylinder assembly 16 can generate one or more rich or lean exhaust gas temperature signals 52, 54 having temperature values that are out-of-range from expected temperature values. For example, a detonation event can occur within the cylinder assembly 16-1 as an EGT sensor 31 generates an exhaust gas temperature signal. Such detonation can cause the EGT sensor 31 to generate an exhaust gas temperature signal indicative of a lower than normal temperature value. These lower than normal temperature value affect the accuracy of the linear regression relationship for the set of rich exhaust gas temperature signals and the set of rich fuel-air ratio values or the linear regression relationship, for the set of lean exhaust gas temperature signals and the set of lean fuel-air ratio values. Accordingly, in one arrangement, the engine controller 30 is configured to detect the accuracy of the linear regression relationships prior to detecting the actual peak fuel-air ratio value 56 for a cylinder assembly 16.

For example, in one arrangement, the engine controller 30 is configured to detect the accuracy of the linear regression relationship based upon a linear regression value for a linear regression of either the set of rich exhaust gas temperature signals and the set of rich fuel-air ratio values or the set of lean exhaust gas temperature signals and the set of lean fuel-air ratio values. With reference to FIG. 4, when performing the linear regression among the four rich data elements 60, 62, 64, and 66 or among the four lean data elements 70, 72, 74, and 76, the engine controller 30 calculates a linear regression (e.g. $R^2$) value 90, indicative of the accuracy of the linear regression for the cylinder assembly 16-1. The engine controller 30 then compares the linear regression value 90 with a preset threshold fit value 92 to detect the presence of instability in the cylinder assembly 16-1. In the case where the engine controller 30 detects that the linear regression value 90 is greater than or equal to the threshold fit value 92 (e.g., a threshold fit value of 0.90), the engine controller 30 detects that the linear regression relationship is accurate. Accordingly, in such a case, the engine controller 30 can continue with steps 108 and 110 described above for the cylinder assembly 16-1. In the case where the engine controller 30 detects that the linear regression value 90 is less than the threshold fit value 92, the engine controller 30 detects that the linear regression relationship is inaccurate. Accordingly, in such a case, the engine controller 30 will refrain from performing steps 108 and 110 described above for the cylinder assembly 16-1 and will perform the procedure of FIG. 2 on the remaining cylinder assemblies (16-2 through 16-6) associated with the aircraft engine 10.

In another example, the engine controller 30 is configured to detect the accuracy of the linear regression relationship based upon a slope of the linear regression for either the set of rich exhaust gas temperature signals and the set of rich fuel-air ratio values or the set of lean exhaust gas temperature signals and the set of lean fuel-air ratio values. With reference to FIG. 4, when performing the linear regression, the engine controller 30 calculates a slope value 94 for the linear regression curves 80, 82. The engine controller 30 then compares an absolute value of the slope value 94 with a preset threshold slope range 96. In the case where the engine controller 30 detects that the slope value 94 falls within the threshold slope range 96 (e.g., a range between about 2000 and 4000), the engine controller 30 that the linear regression relationship is accurate. Accordingly, in such a case, the engine controller 30 can continue with steps 108 and 110 described above for the cylinder assembly 16-1. In the case where the engine controller 30 detects that the slope value 94 falls outside of the threshold slope range 96, the engine controller 30 detects that the linear regression relationship is inaccurate. Accordingly, in such a case, the engine controller 30 will refrain from performing steps 108 and 110 described above for the cylinder assembly 16-1 and will perform the procedure of FIG. 2 on the remaining cylinder assemblies (16-2 through 16-6) associated with the aircraft engine 10.

In one arrangement, the aircraft engine's 10 operating speed, as measured in RPM's, can affect an amount of the fuel-air mixture required to be provided to a cylinder assembly 16 to allow for optimal fuel-efficient operation of the aircraft engine 10. For example, the higher the RPM's of the engine, the larger the volume of the fuel-air mixture that is required to be delivered to a cylinder assembly 16 in order to provide optimal engine efficiency. Accordingly, when operating the fuel delivery devices 28, such as fuel injectors, associated with each cylinder assembly 16, the engine controller 30 is configured to adjust the amount or volume of the fuel-air mixture delivered to the cylinder assembly 16 to take into account different engine operating speeds of the engine 10.

Initially, the engine controller 30 determines a scaling factor, s, configured to normalize the actual peak fuel-air ratio value 56 to remove the dependency of the actual peak fuel-air ratio value 56 on engine speed. For example, the engine controller 30 utilizes the following relationship:

$$s=(((\text{peak fuel-air ratio value}/\text{theoretical fuel-air ratio value})-1)/k)+1$$

to determine the scaling factor s where k in the relationship represents a scaling factor based upon a current operating condition of the engine 10. In one arrangement, the engine controller 30 is configured with a table that includes various values for k for various operating conditions (i.e., taking into consideration engine speed and load) of the engine 10.

Once the engine controller 30 determines a value for s, the engine controller 30 uses the s value to determine a current fuel multiplier value, m, to be used in adjusting the amount or volume of the fuel-air mixture delivered to a cylinder assembly 16. In one arrangement, the engine controller 30 utilizes s value in the following relationship: $m=(k*(s-1))+1$ to determine a current fuel multiplier value, m. The engine controller 30 then utilizes the current fuel multiplier value, m to adjust the duration of operation of a fuel delivery device 28 associated with a cylinder assembly 16. In one arrangement, the engine controller 30 is configured to control the duration of operation of the fuel delivery device 28 to provide a given volume of the fuel-air mixture to a cylinder assembly 16. For example, assume the engine controller 30 is configured to allow the fuel delivery device 28 to operate for a period of two seconds to deliver the fuel-air mixture to the cylinder assembly 16. Prior to activating the fuel delivery device 28, the engine controller multiplies the preconfigured duration value by the calculated m value. Based upon the value of m, this process results in either an increase or a decrease in the duration of operation of the fuel delivery device 28 to either increase or decrease the volume of the fuel-air mixture provided by the fuel delivery device 28 to the cylinder assembly 16.

While various embodiments of the invention have been particularly shown and described, it will be understood by those skilled in the art that various changes in form and details may be made therein without departing from the spirit and scope of the invention as defined by the appended claims.

For example, as indicated above, when performing the linear regression among the four rich data elements 60, 62, 64, and 66 or among the four lean data elements 70, 72, 74, and 76, the engine controller 30 calculates a linear regression (e.g. $R^2$) value 90, indicative of the accuracy of the linear regression for the cylinder assembly 16-1. Such description is by way of example only. In one arrangement, the engine controller performs the linear regression among the first three rich data elements 60, 62, and 64 and among the three lean data elements 70, 72, and 74. The engine controller 30 calculates a rich linear regression (e.g. $R^2$) value 90 based upon the rich data elements 60, 62, and 64 and calculates a lean linear regression value 90 based upon the three lean data elements 70, 72, and 74. Taking the rich data elements 60, 62, and 64 as an example, the engine controller 30 then compares the resulting rich linear regression value 90 to the threshold fit value 92.

In the case where the engine controller 30 detects that the linear regression value 90 is greater than or equal to the threshold fit value 92 (e.g., a threshold fit value of 0.90), the engine controller 30 detects that the linear regression relationship is accurate. Accordingly, in such a case, the engine controller 30 can continue with steps 108 and 110 described above for the cylinder assembly 16-1. In the case where the engine controller 30 detects that the linear regression value 90 is less than the threshold fit value 92, the engine controller 30 detects that the linear regression relationship is inaccurate. Accordingly, in such a case, the engine controller 30 will obtain the fourth rich data element 66 and recalculate the rich linear regression (e.g. $R^2$) value 90 based upon the rich data elements 60, 62, 64, and 66.

What is claimed is:

1. A method for adjusting a fuel-air ratio for a fuel-air mixture provided to a cylinder assembly of an engine, comprising:

- detecting a set of rich exhaust gas temperature signals corresponding to a set of rich fuel-air ratio values, each of the set of rich fuel-air ratio values having a fuel-air ratio value that is greater than a threshold fuel-air ratio value;
- detecting a set of lean exhaust gas temperature signals corresponding to a set of lean fuel-air ratio values, each of the set of lean fuel-air ratio values having a fuel-air ratio value that is less than the threshold fuel-air ratio value;
- detecting an intersection between the set of lean exhaust gas temperature signals and the set of rich exhaust gas temperature signals, the intersection associated with an actual peak fuel-air ratio value;
- comparing the actual peak fuel-air ratio value with the threshold fuel-air ratio value; and
- adjusting the fuel-air ratio in the fuel-air mixture provided to the cylinder assembly based upon the comparison of the actual peak fuel-air ratio value and threshold fuel-air ratio value.

2. The method of claim 1, wherein:

- detecting the set of rich exhaust gas temperature signals comprises:
  - detecting a first rich exhaust gas temperature signal when the fuel-air mixture has a first rich fuel-air ratio value greater than the threshold fuel-air ratio value,
  - decreasing an amount of fuel in the fuel-air mixture, and
  - detecting a second rich exhaust gas temperature signal when the fuel-air mixture has a second rich fuel-air ratio value greater than the threshold fuel-air ratio value; and
- detecting the set of lean exhaust gas temperature signals comprises:
  - detecting a first lean exhaust gas temperature signal when the fuel-air mixture has a first lean fuel-air ratio value less than the threshold fuel-air ratio value,
  - increasing an amount of fuel in the fuel-air mixture, and
  - detecting a second lean exhaust gas temperature signal when the fuel-air mixture has a second lean fuel-air ratio value greater than the threshold fuel-air ratio value.

3. The method of claim 1, wherein detecting an intersection between the set of lean exhaust gas temperature signals and the set of rich exhaust gas temperature signals, comprises:

generating a first function representing a relationship between the set of rich exhaust gas temperature signals and the set of rich fuel-air ratio values;

generating a second function representing a relationship between the set of lean exhaust gas temperature signals and the set of lean fuel-air ratio values; and detecting an exhaust gas temperature value and an fuel-air ratio value common to both the first function and the second function.

4. The method of claim 3, wherein:

generating the first function comprises generating a linear regression relationship for the set of rich exhaust gas temperature signals and the set of rich fuel-air ratio values; and generating the second function comprises generating a linear regression for the set of lean exhaust gas temperature signals and the set of lean fuel-air ratio values.

5. The method of claim 4, wherein comparing the actual peak fuel-air ratio value with the threshold fuel-air ratio value comprises comparing the actual peak fuel-air ratio value with the threshold fuel-air ratio value when a linear regression value for the linear regression relationship of the set of rich exhaust gas temperature signals and the set of rich fuel-air ratio values exceeds a threshold fit value.

6. The method of claim 4, wherein comparing the actual peak fuel-air ratio value with the threshold fuel-air ratio value comprises comparing the actual peak fuel-air ratio value with the threshold fuel-air ratio value when a linear regression value for the linear regression relationship of the set of lean exhaust gas temperature signals and the set of lean fuel-air ratio values falls exceeds a threshold fit value.

7. The method of claim 4, wherein comparing the actual peak fuel-air ratio value with the threshold fuel-air ratio value comprises comparing the actual peak fuel-air ratio value with the threshold fuel-air ratio value when a ratio between a change in rich exhaust gas temperature signal values and a change in rich fuel-air ratio values falls within a threshold slope range.

8. The method of claim 4, wherein comparing the actual peak fuel-air ratio value with the threshold fuel-air ratio value comprises comparing the actual peak fuel-air ratio value with the threshold fuel-air ratio value when a ratio between a change in lean exhaust gas temperature signal values and a change in lean fuel-air ratio values falls within a threshold slope range.

9. The method of claim 1, comprising adjusting a volume of the fuel-air mixture delivered to the cylinder assembly based upon a scaling factor.

10. The method of claim 1, comprising, after detecting the set of rich exhaust gas temperature signals corresponding to a set of rich fuel-air ratio values, decreasing the amount of fuel in the fuel-air mixture such that fuel-air ratio value is less than the threshold fuel-air ratio value.

11. An engine control system, comprising:

an exhaust gas temperature sensor, the exhaust gas temperature sensor configured to generate gas temperature signals associated with a cylinder assembly of an engine; and an engine controller disposed in electrical communication with the exhaust gas temperature sensor, the engine controller being operable to adjust a fuel-air ratio for a fuel-air mixture provided to the cylinder assembly, the engine controller configured to:

detect a set of rich exhaust gas temperature signals corresponding to a set of rich fuel-air ratio values, each of the set of rich fuel-air ratio values having a fuel-air ratio value that is greater than a threshold fuel-air ratio value;

detect a set of lean exhaust gas temperature signals corresponding to a set of lean fuel-air ratio values, each of the set of lean fuel-air ratio values having a fuel-air ratio value that is less than the threshold fuel-air ratio value;

detect an intersection between the set of lean exhaust gas temperature signals and the set of rich exhaust gas temperature signals, the intersection associated with an actual peak fuel-air ratio value;

compare the actual peak fuel-air ratio value with the threshold fuel-air ratio value; and adjust the fuel-air ratio in the fuel-air mixture provided to the cylinder assembly based upon the comparison of the actual peak fuel-air ratio value and threshold fuel-air ratio value.

12. The engine controller of claim 11, wherein:

when detecting the set of rich exhaust gas temperature signals, the engine controller is configured to:

detect a first rich exhaust gas temperature signal when the fuel-air mixture has a first rich fuel-air ratio value greater than the threshold fuel-air ratio value, decrease an amount of fuel in the fuel-air mixture, and detect a second rich exhaust gas temperature signal when the fuel-air mixture has a second rich fuel-air ratio value greater than the threshold fuel-air ratio value; and when detecting the set of lean exhaust gas temperature signals, the engine controller is configured to:

detect a first lean exhaust gas temperature signal when the fuel-air mixture has a first lean fuel-air ratio value less than the threshold fuel-air ratio value, increase an amount of fuel in the fuel-air mixture, and detect a second lean exhaust gas temperature signal when the fuel-air mixture has a second lean fuel-air ratio value greater than the threshold fuel-air ratio value.

13. The engine controller of claim 12, wherein when detecting an intersection between the set of lean exhaust gas temperature signals and the set of rich exhaust gas temperature signals, the engine controller is configured to:

generate a first function representing a relationship between the set of rich exhaust gas temperature signals and the set of rich fuel-air ratio values;

generate a second function representing a relationship between the set of lean exhaust gas temperature signals and the set of lean fuel-air ratio values; and detect an exhaust gas temperature value and an fuel-air ratio value common to both the first function and the second function.

14. The engine controller of claim 13, wherein the engine controller is configured to:

generate the first function comprises generating a linear regression relationship for the set of rich exhaust gas temperature signals and the set of rich fuel-air ratio values; and generate the second function comprises generating a linear regression for the set of lean exhaust gas temperature signals and the set of lean fuel-air ratio values.

15. The engine controller of claim 14, wherein when comparing the actual peak fuel-air ratio value with the threshold fuel-air ratio value the engine controller is configured to compare the actual peak fuel-air ratio value with the threshold fuel-air ratio value when a linear regression value for the linear regression relationship of the set of rich exhaust gas temperature signals and the set of rich fuel-air ratio values exceeds a threshold fit value.

16. The engine controller of claim 14, wherein when comparing the actual peak fuel-air ratio value with the threshold fuel-air ratio value the engine controller is configured to compare the actual peak fuel-air ratio value with the threshold fuel-air ratio value when a linear regression value for the linear regression relationship of the set of lean exhaust gas temperature signals and the set of lean fuel-air ratio values falls exceeds a threshold fit value.

17. The engine controller of claim 14, wherein when comparing the actual peak fuel-air ratio value with the threshold fuel-air ratio value the engine controller is configured to compare the actual peak fuel-air ratio value with the threshold fuel-air ratio value when a ratio between a change in rich exhaust gas temperature signal values and a change in rich fuel-air ratio values falls within a threshold slope value.

18. The engine controller of claim 14, wherein when comparing the actual peak fuel-air ratio value with the threshold fuel-air ratio value the engine controller is configured to compare the actual peak fuel-air ratio value with the threshold fuel-air ratio value when a ratio between a change in lean exhaust gas temperature signal values and a change in lean fuel-air ratio values falls within a threshold slope value.

19. The engine controller of claim 11, comprising adjusting a volume of the fuel-air mixture delivered to the cylinder assembly based upon a scaling factor.

20. The engine controller of claim 11, wherein, after detecting the set of rich exhaust gas temperature signals corresponding to a set of rich fuel-air ratio values, the engine controller is configured to decrease the amount of fuel in the fuel-air mixture such that fuel-air ratio value is less than the threshold fuel-air ratio value.

* * * * *